Figure 1:
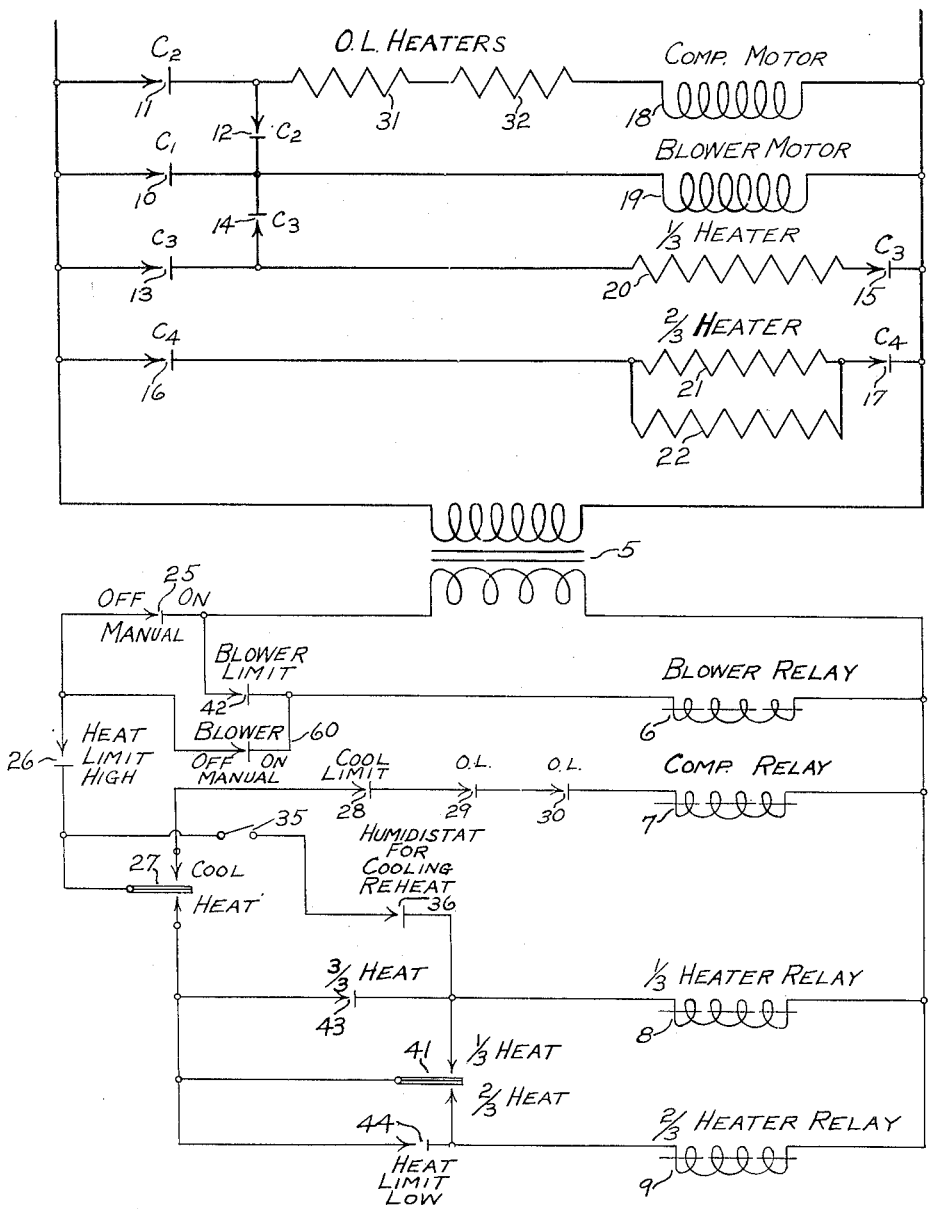

March 6, 1951  R. W. QUALLEY ET AL  2,544,544
HEATING SYSTEM
Filed May 28, 1946  4 Sheets-Sheet 1

INVENTOR.
RAY W. QUALLEY
BY ALWIN B. NEWTON
Harness & Harris

Patented Mar. 6, 1951

2,544,544

UNITED STATES PATENT OFFICE 2,544,544

HEATING SYSTEM

Ray W. Qualley, Dayton, and Alwin B. Newton, Oakwood, Ohio, assignors to Chrysler Corporation, Highland Park, Mich., a corporation of Delaware Application May 28, 1946, Serial No. 672,843

12 Claims. (Cl. 219—20)

1

The object of our present invention is to provide an air conditioning system which will be automatically operative at any season of the year to provide properly conditioned air for human comfort. Our invention comprises heating and cooling means arranged to treat the air being introduced to a dwelling or other occupied space in an entirely correct manner. It is well known in the air conditioning art that in the spring and fall there are certain days when excessive humidity makes it difficult to control an air conditioner. This is particularly true since most efforts have been directed toward the addition of a cooling system to an existing heating system, or to the establishment of separate heating and cooling systems, without appropriate means for interconnecting the two systems. The principal object of our invention is to provide a single system having correct relationship of the heating and cooling parts whereby properly conditioned air may be produced at all seasons of the year.

A further object of our invention is to provide a simple set of interrelated controls for accomplishing correct air conditioning at all seasons of the year, such controls being so connected in a control system that the minimum of attention is required. It is well known that the average user of an air conditioning system does not know what to do in order to obtain the result he desires. For example, at certain days of the year the occupants may feel uncomfortable even though the temperature of the air is correct for human comfort, this being due to excessive humidity or other reasons. It would not occur to the average person that further cooling of the air would be desirable under such circumstances. Actually further cooling is desirable to remove the excess humidity provided the air is then reheated back to its original temperature. An object of our invention is to provide an air conditioning system which will automatically function to achieve this result.

A further object of our invention is to provide an air conditioning system having heating means incorporated therein, the heating means being partially or wholly effective according to the temperature of the air being treated, and the partial effectiveness being variable according to the temperature of the air being treated, whereby more even results may be obtained than with a system having a heater which is fully operative or inoperative.

A further object of our invention is to provide a system of controls for an all year heating and cooling system including means to anticipate the effect of certain operations. The usual air conditioning system comprises controls which sense a condition of the air in the conditioned space. When a control is satisfied it operates to turn off the heating or cooling means as the case may be but, due to the large volume of air between the conditioner and the control, this is usually too late and the occupants are subjected to a succession of delayed actions resulting in overheating or undercooling as the result may be. With our invention the need for cooling or heating, or the desirability of turning off the cooling or heating means, is anticipated so that the room conditions are maintained at a desired constant level.

The foregoing and other objects and advantages of our invention will be apparent from an inspection of the following specification taken in connection with the accompanying drawings wherein like numerals refer to like parts throughout.

Figure 2:
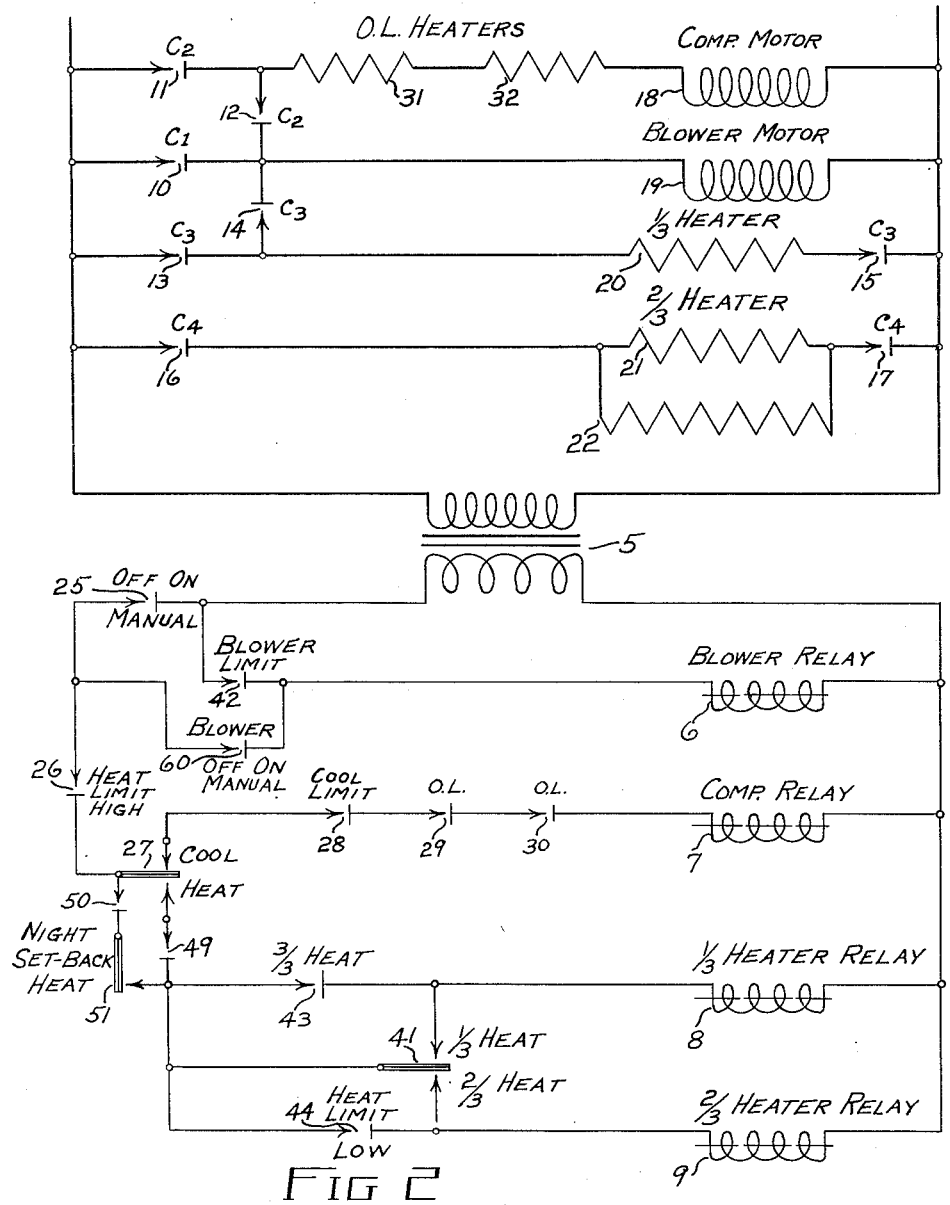
Figure 3:
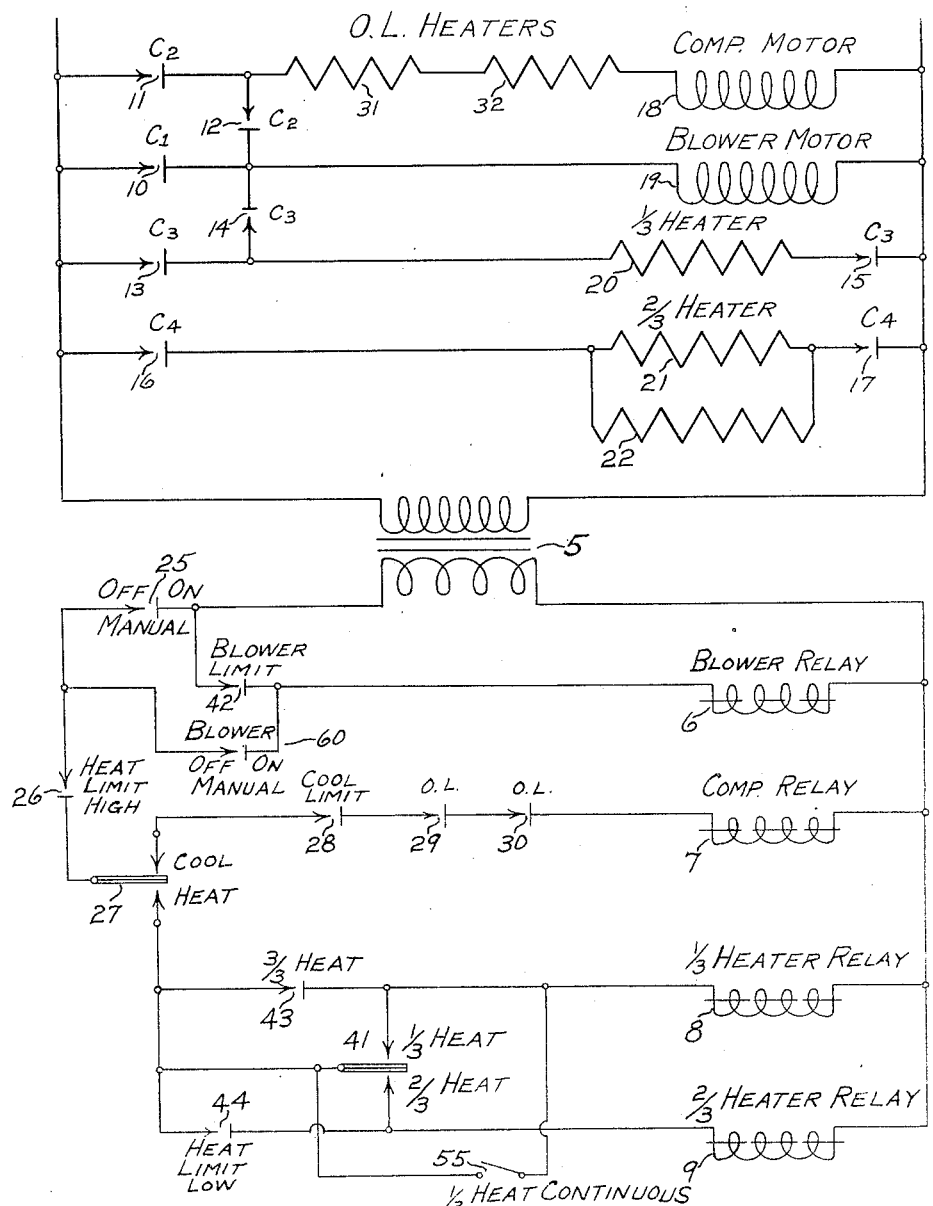

In the drawings Fig. 1 schematically discloses the basic, preferred form of the control system comprising our invention; Fig. 2 discloses a modified form of the control system; Fig. 3 discloses a further modification; and Fig. 4 discloses a schematic representation of an air conditioning system comprising our invention.

Figure 4:
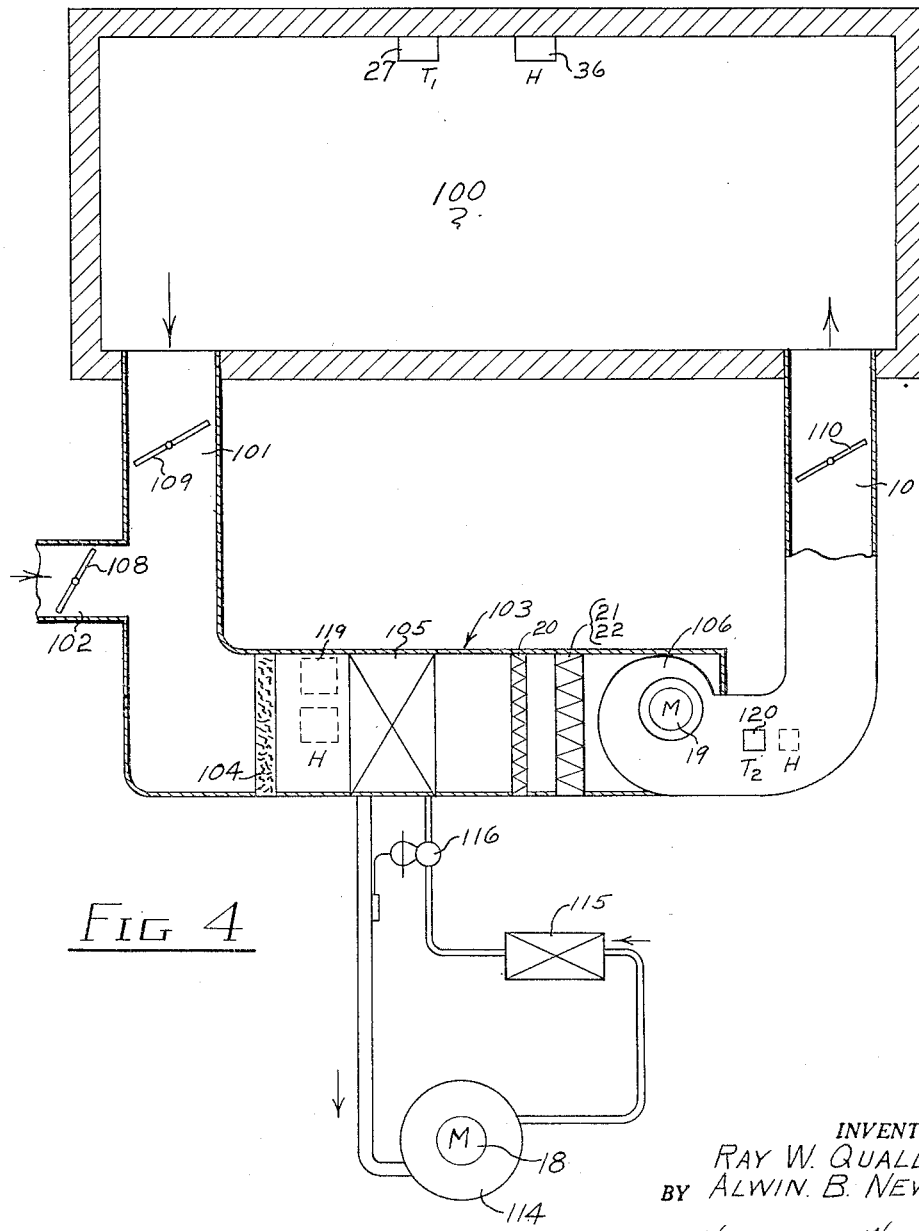

Referring to Fig. 4 there is disclosed a dwelling or other occupied space 100 with which is associated an air conditioner 103 having a return air duct 101, a fresh air duct 102, and a discharge duct 107 connected thereto. In the preferred form the return and fresh airs are commingled before treatment and the total air volume passes successively through a filter 104, a cooling coil 105, a first heating means comprising an electrical resistance coil 20, a second heating means comprising a set of electrical resistance heating coils 21—22, the set preferably having twice the capacity of the coil 20, and is then forced by a blower 106 through the discharge duct 107 into the conditioned space. The ducts 101, 102 and 107 are preferably provided with dampers 109, 108 and 110 respectively for controlling the air volumes.

As is well known in the art the volume of fresh air introduced through duct 102 may depend wholly upon leakage from the conditioned space, or an exhaust damper (not shown) may be provided. The coil 105 may be provided with refrigerant from a system comprising a compressor 114 discharging through a condenser 115 and an expansion valve 116 into the coil, but other forms of cooling means may be substituted therefor.

The heating means are preferably electrical resistance coils because of their simplicity, small size, and the availability of cheap current in many sections where all-year air conditioning is desirable, but other forms of heating means may be substituted therefor.

In Fig. 1 there is disclosed a control circuit at the bottom of the figure and a power circuit at the top of the figure, the former drawing current from the latter through transformer 5. The control circuit comprises a blower relay 6, a compressor relay 7, a one-third heater relay 8, for controlling the heater 20, and a two-thirds heater relay 9 for controlling the heaters 21 and 22. The blower relay 6 opens and closes contact 10 in the power circuit; the compressor relay 7 opens and closes contacts 11 and 12 in the power circuit; the relay 8 opens and closes contacts 13, 14 and 15 in the power circuit and the relay 9 opens and closes contacts 16 and 17 in the power circuit. When the blower relay 6 is energized a power circuit is established as follows: Left power line, contact 10, blower motor 19, to right power line. When the compressor relay 7 is energized a circuit is established as follows: Left power line, contact 11, compressor motor overload protective device heaters 31 and 32, compressor motor 18, to right power line. At the same time a circuit is established as follows: Left power line, contact 11, contact 12, blower motor 19 to right power line, so that the blower motor is energized whenever the compressor motor is energized. When the heater relay 8 is energized a power circuit is established as follows: From left power line through contact 13, heater 20, and contact 15 to the right power line, so that one-third of the total heating capacity is provided whenever relay 8 is energized. At the same time a circuit is completed comprising left power line, contact 13, contact 14, and blower motor 19 to the right power line, so that the blower motor is energized whenever heater 20 is energized. When relay 9 is energized a power circuit is established comprising left power line, contact 16, heaters 21 and 22 which are connected in parallel, and contact 17 to the right power line. No provision is made for operating the blower motor by relay 9.

The control circuit comprises the secondary of transformer 5 and a plurality of control means. In order to understand the system better the description will comprise the functioning of the controls to establish certain conditions at certain seasons of the year.

When cooling is desired a control circuit will be established as follows: Transformer 5 through manual switch 25 at the "on" position, a high heat limit switch 26 which will always be in closed position since the air is not being heated, a two-way thermostat 27 which has closed to contact the cooling side, a cooling limit switch 28, overload switches 29 and 30 which are normally in closed position but will open if overload heaters 31 and 32 indicate that the compressor motor is being overloaded, the compressor relay 7 and back to transformer. This circuit will remain closed unless the manual switch 25 is turned to "off," or the thermostat 27 opens because of satisfaction of the cooling demand or the cooling limit switch 28, which is preferably located at 119 (Fig. 4), but may also be located at 120, opens in anticipation of satisfaction of the cooling demand. It is to be noted that the closing of the contacts 11 and 12 controlled by the compressor relay also energizes the blower motor.

Let us now assume that the temperature of the air is substantially correct but the humidity is excessive. In such case a circuit will be established from transformer 5, through manual switch 25, limit switch 26, manual switch 35, humidostat 36, relay 8, to transformer 5, so that the air being treated will become heated by operation of the heater 20. The humidostat 36 and the thermostat 27 are preferably side by side in the conditioned space so that immediately upon a rise in temperature in the conditioned space the thermostat 27 establishes the cooling cycle. The blower has already been energized by the heater relay closing the contacts 13 and 14. The air being treated is therefore cooled to remove excess moisture and then reheated to bring it back to the correct temperature.

Let us now assume that heating is desired. In such case the control circuit will comprise the following: From transformer 5 through manual switch 25, high heat limit switch 26, thermostat 27 which has contacted its heating contact, a bimetallic or other similar device 41 of the snap acting type which normally rests in contact with its upper contact, relay 8 and back to transformer 5. This energizes the heater 20 and simultaneously the blower motor 19. The bimetallic element 41 is preferably located at the discharge side of the conditioning unit as indicated at 120 in Fig. 4. Operation of the heater causes a rise in temperature of the air being treated to a certain extent sufficient to cause the element 41 to snap over to its lower contact, thus establishing a circuit through the relay 9 and breaking the circuit through the relay 8, thus deenergizing heater 20 and energizing heaters 21 and 22. It is to be noted that relay 9 does not control the blower motor but the blower relay will be energized through the circuit including transformer 5 and blower limit switch 42, located at 120, which closes when the air being treated passes above a certain point so that circulation of air is provided whenever warm enough air will reach the room. A further rise in temperature will cause the closing of the total heat switch 43, also located at 120, so that simultaneous operation of relays 8 and 9 and simultaneous operation of heaters 20, 21 and 22 is assured. If at any time in the cycle of heating, which commences with one-third heating capacity, steps to two-thirds heating capacity, and then steps to three-thirds heating capacity, the temperature of the air being treated passes a high limit such that overheating of the unit would occur, the limit switch 26, located at 120, will open, thus shutting off all the heaters but allowing the blower to continue functioning. The blower will continue to function regardless of the heating or cooling effect if manual switch 60 is closed but preferably manual switch 60 is opened, the blower nevertheless continuing to function until the temperature of the air being treated is below the setting of blower limit switch 42. The blower limit switch 42 is preferably located at 120 and the setting of the switch is preferably such as to anticipate the desirability of discontinuing circulation before an undesirable reduction of temperature results. Perhaps before the blower limit switch opens, 27 will again contact its heating contact to cause commencement of the heating cycle.

In addition to the foregoing a low heating limit switch 44 may be provided at 119 for rare occasions such as following a breakdown, initial starting of the system after periods of disuse, or the like. The switch 44 is designed to close at a low temperature so that closing of switch 25 will result in operation of relay 9 through 44 in addition to operation of relay 8 through 41. Switch 44 is designed to open before switch 41 snaps from its upper to its lower position, thus providing means for quickly bringing the temperature up to a desired point and thereafter maintaining the temperature at the desired point through the normal heating cycling means.

The high heat limit switch 26 is preferably located at 120 and is in series with the room thermostat 27 so that opening of either will stop the heating cycle. Limit switch 26 however is in position to anticipate overheating of the dwelling if the heating means were allowed to continue to operate. The coaction of the two results in turning off of any of the heating means if the dwelling or conditioned space is at the desired temperature or will arrive at the desired temperature as soon as the volume of air between the conditioner and the conditioned space has been introduced into the conditioned space.

It is to be noted that the blower relay 6 may be controlled by the blower switch 60 when the manual switch 25 is closed so that circulation of air is assured at all times such as when heating limit switch 44 is effective after a period of long disuse. However, the switch 60 may be opened, thus assuring control of the blower by the blower limit switch 42 so as to have the blower operate whenever the compressor or either of the heaters is in operation, but not if the temperature of the air being treated is such that an undesirable drop in temperature in the enclosed space may result from circulation. In such case the heating cycle will immediately commence to correct this condition before the blower operates.

The system disclosed in Fig. 2 is exactly the same as the system of Fig. 1 except that the cooling reheat circuit has been removed for clarity and a possible addition is indicated. This addition comprises a night setback thermostat for the heating cycle. The normal daytime heating cycle is shown as being under control of a switch 49, and a night setback thermostat 51 is indicated in parallel with the normal daytime thermostat 27 and under control of a switch 50. When 49 is opened and 50 closed the demand for heat will be placed under control of the night setback thermostat 51, which may be set in the same casing with the thermostat 27.

The system disclosed in Fig. 3 is exactly the same as the previous systems except that the cooling reheat circuit and the night setback thermostat have been removed for clarity and a switch 55 has been added to place the relay 8 under direct control of the heating thermostat 27 so that the heater 20 will operate continuously at all times when the thermostat 27 is closed. This may be found desirable in some localities and in any event acts to smooth any irregularities in the temperature of the air.

As indicated in Fig. 4 the humidostat 36 may be removed from the conditioned space and located either at the inlet side of the conditioner or in the discharge air stream. The setting of the humidostat would be appropriately selected according to its position so as to indicate a need for moisture removal and cooling reheat.

It should be apparent from the foregoing that we have provided an all year air conditioning system comprising cooling means, first heating means, second heating means, air circulating means for conducting air from and to a space and in heat transferring relation with said heating and cooling means, and a control circuit for said heating and cooling means, a first portion of said circuit comprising means to operate said cooling means whenever the temperature of the air conditioned space is higher than a comfortable range and means to turn off said cooling means if the temperature of the air after being treated passes below a predetermined point before the temperature of the air conditioned space arrives within said comfortable range, a second portion of said circuit comprising means to operate said heaters whenever the temperature of the air conditioned space is below said comfortable range, said second portion including means to operate both said heaters whenever the temperature of the air being treated is below a predetermined minimum, means to operate said first heater alone whenever the temperature of the air after being treated is between said minimum and a first higher temperature, means to operate said second heater alone whenever the temperature of the air being treated is between said first higher temperature and a second higher temperature, means to operate both of said heaters whenever the temperature of the air after being treated is between said second higher temperature and a third higher temperature, and means to turn off said heaters if the temperature of the air after being treated passes above a predetermined maximum before the temperature of the air conditioned space arrives within said comfortable range, and a third portion of said circuit comprising means to operate said blower whenever said cooling means is in operation, whenever either of said heaters is in operation, or whenever the temperature of the air after being treated is above a predetermined point.

Having described and illustrated a preferred embodiment of our invention it should be apparent to those skilled in the art that modification in detail and arrangement thereof are possible. All such as come within the scope of the following claims are considered to be a part of our invention.

We claim:

1. An air conditioning system comprising first heating means, second heating means, air circulating means for conducting air from and to a space and in heat transferring relation with said heating means, and a control circuit for said heating means adapted to operate said heaters whenever the temperature of the air conditioned space is below a comfortable range, said circuit including means to operate said first heater alone whenever the temperature of the air after being treated is between a predetermined minimum and a first higher temperature, means to operate said second heater alone whenever the temperature of the air after being treated is above said first higher temperature, means to supplement the operation of said first heater with the operation of said second heater whenever the temperature of the air being treated is below a predetermined minimum, means to add the operation of said first heater to said second heater whenever the temperature of the air after being treated is between a second higher temperature and a third higher temperature, means to turn off said heaters if the temperature of the air after being treated passes above a predetermined point before the temperature of the air conditioned space arrives within said comfortable range, and means to operate said air circulating means whenever the temperature of the air after being treated is above a predetermined point.

2. An air conditioning system comprising first heating means, second heating means, air circulating means for conducting air from and to a space and in heat transferring relation with said heating means, and a control circuit for said heating means adapted to operate said heaters whenever the temperature of the air conditioned space is below a comfortable range, said circuit including means to operate said first heater alone whenever the temperature of the air after being treated is between a predetermined minimum and a first higher temperature, means to operate said second heater whenever the temperature of the air after being treated is above said first higher temperature, means to add the operation of said first heater to said second heater whenever the temperature of the air after being treated is between a second higher temperature and a third higher temperature, and means to turn off said heaters if the temperature of the air after being treated passes above a predetermined maximum before the temperature of the air conditioned space arrives within said comfortable range.

3. In an air conditioning system, a plurality of heating means, means to circulate air from and to a conditioned space and in heat transferring relation to said heating means, an electrical control system for said heating means including a first thermostatic switch adapted to close if the temperature of said space is below a desired maximum, a second thermostatic switch arranged in series with said first switch and having first and second operative positions, said first position establishing a circuit through said second switch to one of said heating means; said second position establishing a circuit to a larger heating means, said second switch being adapted to assume said first or said second operative position in response to changes in the temperature of the air passing from said heating means and a third thermostatic switch arranged in series with said first and second switches and adapted to open if the temperature of the air passing from said heaters exceeds a desired maximum.

4. In an air conditioning system, a duct, a plurality of electric resistance heaters positioned across said duct, means to circulate air from and to a space through said duct, a control circuit for said heaters including a first thermostatic switch adapted to close when the temperature of said space is below a desired comfortable range, and a second thermostatic switch in series with said first switch and adapted to electrically connect a first one of said heaters with said circuit below a predetermined temperature of the air being treated and to electrically connect a second one of said heaters with said circuit above said predetermined temperature.

5. In an air conditioning system, a duct, a plurality of electric resistance heaters positioned across said duct, means to circulate air from and to a space through said duct, a control circuit for said heaters including a first thermostatic switch adapted to close when the temperature of said space is below a desired comfortable range, a second thermostatic switch in series with said first switch and adapted to electrically connect a first one of said heaters with said circuit below a predetermined temperature of the air being treated and to electrically connect a second one of said heaters with said circuit above said predetermined temperature, and a third thermostatic switch in said circuit in series with said first switch and in parallel with said second switch and adapted to connect said first one of said heaters with said circuit when the temperature of the air leaving said heaters passes a maximum limit from the heating effect of said second heater.

6. The method of air conditioning comprising moving a stream of air from and to a space and over a plurality of heaters, turning on a first one of said heaters whenever the temperature of the space is below a comfortable range, and turning off said heater and turning on a second heater of larger capacity if the temperature of said stream of air after being heated by said first heater is below a maximum limit before the temperature of said space exceeds said comfortable range.

7. The method of air conditioning comprising moving a stream of air from and to a space and over a plurality of heaters, turning on a first one of said heaters whenever the temperature of the space is below a comfortable range, turning off said heater and turning on a second heater of larger capacity if the temperature of said stream of air after being heated by said first heater is below a maximum limit before the temperature of said space exceeds said comfortable range, and turning on both of said heaters if the temperature of said stream of air after being heated by said second heater is still below said maximum limit before the temperature of said space exceeds said comfortable range.

8. In an air conditioning system a plurality of heaters of different total heating effects, means to move a stream of air from and to a space and in heat transferring relation to said heaters, means to turn on the smallest effectual one of said heaters when the temperature of said space is below said comfortable range, and means to turn off said heater and turn on a heater of greater effect if the temperature of the air leaving said heaters passes a percentage of the total rise possible by use of said first heater alone before the temperature of said space exceeds said comfortable range.

9. In an air conditioning system a plurality of heaters of different total heating effects, means to move a stream of air from and to a space and in heat transferring relation to said heaters, means to turn on the smallest effectual one of said heaters when the temperature of said space is below said comfortable range, means to turn off said heater and turn on a heater of greater effect if the temperature of the air leaving said heaters passes a percentage of the total rise possible by use of said first heater alone before the temperature of said space exceeds said comfortable range, and means to turn on both of said heaters if the temperature of the air leaving said heaters passes a percentage of the total rise possible by use of said second heater alone before the temperature of said space exceeds said comfortable range.

10. In an air conditioning system a plurality of heaters of different total heating effects, means to move a stream of air from and to a space and in heat transferring relation to said heaters, means to turn on the smallest effectual one of said heaters when the temperature of said space is below said comfortable range, means to turn off said heater and turn on a heater of greater effect if the temperature of the air leaving said heaters passes a percentage of the total rise possible by use of said first heater alone before the temperature of said space exceeds said comfortable range, means to turn on both of said heaters if the temperature of the air leaving said heaters passes a percentage of the total rise possible by use of said second heater alone before the temperature of said space exceeds said comfortable range, and means to turn off said heaters if the temperature of the air leaving said heaters passes a maximum limit.

11. In an air conditioning system a plurality of heaters of different total heating effects, means to move a stream of air from and to a space and in heat transferring relation to said heaters, means to turn on the smallest effectual one of said heaters when the temperature of said space is below said comfortable range, means to turn off said heater and turn on a heater of greater effect if the temperature of the air leaving said heaters passes a percentage of the total rise possible by use of said first heater alone before the temperature of said space exceeds said comfortable range, means to turn on both of said heaters if the temperature of the air leaving said heaters passes a percentage of the total rise possible by use of said second heater alone before the temperature of said space exceeds said comfortable range, and means to turn off said heaters if the temperature of the air leaving said heaters passes a maximum limit or the temperature of said space exceeds said comfortable range.

12. An air conditioning system comprising heating apparatus provided with first, second and third heating stages, air circulating means for conducting air from and to a space and in heat transferring relation with said heating apparatus and a control circuit for said heating apparatus adapted to operate said apparatus whenever the temperature of the air conditioning space is below a comfortable range, said circuit including means to operate said apparatus in said first stage whenever the temperature of the air after being treated is between a predetermined minimum and a first higher temperature, means to operate said apparatus in said second stage whenever the temperature of the air after being treated is between said first higher temperature and a second higher temperature, means to operate said apparatus in said third stage whenever the temperature of the air after being treated is between said second higher temperature and a third higher temperature and means to turn off said apparatus as the temperature of the air conditioned space arrives within said comfortable range.

RAY W. QUALLEY.
ALWIN B. NEWTON.

REFERENCES CITED

The following references are of record in the file of this patent:

UNITED STATES PATENTS

| Number | Name | Date |
|---|---|---|
| 1,811,378 | Bannister | June 23, 1931 |
| 1,998,916 | Young et al. | Apr. 23, 1935 |
| 2,126,182 | Fillo | Aug. 9, 1938 |
| 2,168,680 | Nordgren | Aug. 8, 1939 |
| 2,201,765 | Euwer | May 21, 1940 |
| 2,238,688 | Guler | Apr. 15, 1941 |
| 2,266,563 | McCorkle | Dec. 16, 1941 |
| 2,315,517 | Greenlee et al. | Apr. 6, 1943 |